United States Patent
Otsuki et al.

(10) Patent No.: US 7,939,206 B2
(45) Date of Patent: May 10, 2011

(54) NON-AQUEOUS ELECTROLYTE FOR CELL, NON-AQUEOUS ELECTROLYTE CELL HAVING THE SAME AS WELL AS ELECTROLYTE FOR POLYMER CELL AND POLYMER CELL HAVING THE SAME

(75) Inventors: Masashi Otsuki, Kodaira (JP); Takao Ogino, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1004 days.

(21) Appl. No.: 10/583,412

(22) PCT Filed: Dec. 22, 2004

(86) PCT No.: PCT/JP2004/019218
§ 371 (c)(1),
(2), (4) Date: Jun. 20, 2006

(87) PCT Pub. No.: WO2005/064734
PCT Pub. Date: Jul. 14, 2005

(65) Prior Publication Data
US 2007/0172740 A1 Jul. 26, 2007

(30) Foreign Application Priority Data

Dec. 26, 2003 (JP) ................................. 2003-432031
Dec. 26, 2003 (JP) ................................. 2003-432139

(51) Int. Cl.
*H01M 10/40* (2006.01)
(52) U.S. Cl. ........ 429/326; 429/324; 429/330; 429/331; 429/332

(58) Field of Classification Search ........................ None
See application file for complete search history.

(56) References Cited

U.S. PATENT DOCUMENTS

| 5,830,600 A | 11/1998 | Narang et al. | |
|---|---|---|---|
| 2004/0191635 A1* | 9/2004 | Otsuki et al. | ................... 429/326 |
| 2004/0192853 A1* | 9/2004 | Otsuki et al. | ................... 525/280 |

FOREIGN PATENT DOCUMENTS

| EP | 1 052 720 A1 | | 11/2000 |
|---|---|---|---|
| EP | 1 328 036 A1 | | 7/2003 |
| JP | 9-213348 A | | 8/1997 |
| JP | 09-231348 | * | 8/1997 |
| JP | 2003-16833 A | | 1/2003 |
| JP | 2003-92137 A | | 3/2003 |
| JP | 2003-234127 A | | 8/2003 |
| JP | 2003-249233 | * | 9/2003 |
| JP | 2003-249233 A | | 9/2003 |
| WO | 03/005478 A1 | | 1/2003 |
| WO | 03/005479 A1 | | 1/2003 |
| WO | 03/041197 A1 | | 5/2003 |

* cited by examiner

*Primary Examiner* — Ula C Ruddock
*Assistant Examiner* — Tony Chuo
(74) *Attorney, Agent, or Firm* — Sughrue Mion, PLLC

(57) ABSTRACT

This invention relates to a non-aqueous electrolyte for a cell and an electrolyte for a polymer cell in which the risk of igniting-firing an aprotic organic solvent retained in the cell and leaked out of the cell through vaporization or the like when the temperature of the cell rises abnormally is reduced, and to a non-aqueous electrolyte for a cell and an electrolyte for a polymer cell comprising an aprotic organic solvent and a compound containing phosphorus and/or nitrogen in its molecule and having a difference of a boiling point from that of the aprotic organic solvent of not more than 25° C.

5 Claims, No Drawings

US 7,939,206 B2

NON-AQUEOUS ELECTROLYTE FOR CELL, NON-AQUEOUS ELECTROLYTE CELL HAVING THE SAME AS WELL AS ELECTROLYTE FOR POLYMER CELL AND POLYMER CELL HAVING THE SAME

TECHNICAL FIELD

This invention relates to a non-aqueous electrolyte for a cell and a non-aqueous electrolyte cell comprising the same as well as an electrolyte for a polymer cell and a polymer cell comprising the same, and more particularly to a non-aqueous electrolyte for a cell and an electrolyte for a polymer cell in which a risk of ignition in an emergency is highly reduced.

BACKGROUND ART

Recently, cells having a light weight, a long service life and a high energy density are particularly demanded as a main power source or an auxiliary power source for electric automobiles and fuel cell vehicles, or as a power source for small-size electronics devices. For this demand, a non-aqueous electrolyte cell using lithium as an active substance for a negative electrode is known as one of the cells having a high energy density because an electrode potential of lithium is lowest among metals and an electric capacity per unit volume is large, and many kinds of such a cell are actively studied irrespectively of primary cell and secondary cell, and a part thereof is practiced and supplied to markets. For example, the non-aqueous electrolyte primary cells are used as a power source for cameras, electronic watches and various memory backups. Also, the non-aqueous electrolyte secondary cells are used as a driving power source for note-type personal computers, mobile phones and the like, and further they are investigated to use as the main power source or the auxiliary power source for the electric automobiles and the fuel cell vehicles.

In these non-aqueous electrolyte cells, since lithium as an active substance for a negative electrode violently reacts with a compound having an active proton such as water, alcohol or the like, an electrolyte used in these cells is limited to an aprotic organic solvent such as ester compound, ether compound or the like. Although the aprotic organic solvent is low in the reactivity with lithium as the active substance for the negative electrode, there is a high risk that if a large current flows violently, for example, in the short-circuiting or the like and the cell generates abnormal heat, the aprotic organic solvent is vaporized and decomposed to generate a gas, or the generated gas and heat cause explosion and ignition of the cell, fire is caught by a spark generated in the short-circuiting or the like.

On the contrary, there is developed a non-aqueous electrolyte cell in which a phosphazene compound is added to a non-aqueous electrolyte for the cell so as to give non-combustibility, flame retardance or self-extinguishing property to the electrolyte, whereby the risk of igniting-firing the cell in an emergency such as the short-circuiting or the like is highly reduced (see JP-A-H06-13108).

Moreover, a separator is used in the above-mentioned non-aqueous electrolyte secondary cell for preventing the contact between a positive electrode and a negative electrode. As the separator is used a porous thin-layer film or the like not obstructing ionic migration in the electrolyte. However, the thin-layer film does not have an ability of holding the electrolyte, so that there is a risk of liquid leakage in the cells using the thin-layer film as a separator.

On the contrary, polymer cells using a polymer for an electrolyte are recently developed as a cell having no fear of liquid leakage. Particularly, the polymer cell is recently and increasingly studied because the formation of film is possible and the assembling property into an electronic device is good and the effective utilization of spaces is possible in addition to no fear of liquid leakage. As the electrolyte used in the polymer cell, there are known a true polymer electrolyte formed by carrying a lithium salt on a polymer, and a gel electrolyte formed by swelling a polymer with an organic solvent. However, the true polymer electrolyte has a problem that an ion conductivity is considerably lower than that of the gel electrolyte. On the other hand, in the polymer cell using the gel electrolyte, since a lithium metal or a lithium alloy is used as a material for a negative electrode likewise the aforementioned non-aqueous electrolyte secondary cell and such a negative electrode violently reacts with a compound having an active proton such as water, alcohol or the like, the organic solvent used in the gel electrolyte is limited to an aprotic organic solvent such as ester compound, ether compound or the like. Although the aprotic organic solvent is low in the reactivity with lithium as the active substance for the negative electrode, there is a high risk that if a large current flows violently, for example, in the short-circuiting or the like and the polymer cell generates abnormal heat, the aprotic organic solvent is vaporized and decomposed to generate a gas, or the generated gas and heat cause explosion and ignition of the cell, fire is caught by a spark generated in the short-circuiting or the like.

On the contrary, there is developed a polymer cell in which a phosphazene compound is added to an electrolyte for the polymer cell so as to give non-combustibility, flame retardance or self-extinguishing property to the electrolyte, whereby the risk of igniting-firing the polymer cell in an emergency such as the short-circuiting or the like is highly reduced (see WO 03/005478A).

SUMMARY OF THE INVENTION

Although the risk of ignition-firing is highly reduced in the non-aqueous electrolyte for the cell and the electrolyte for the polymer cell added with the phosphazene compound, if the phosphazene compound is vaporized earlier than the aprotic organic solvent due to the rise of the cell temperature in the emergency such as short-circuiting or the like it is impossible to eliminate the risk that the remaining aprotic organic solvent is vaporized and decomposed alone to generate a gas, or the generated gas and heat cause explosion and ignition of the cell, and the aprotic organic solvent is fired by a spark generated in the short-circuiting, and so on. Moreover, if the aprotic organic solvent is vaporized earlier than the phosphazene compound, there is a risk that the vaporized aprotic organic solvent leaks out of the cell and catches fire.

It is, therefore, an object of the invention to provide a non-aqueous electrolyte for a cell and an electrolyte for a polymer cell which reduces the risk of igniting-firing the aprotic organic solvent retained in the cell when the aprotic organic solvent is vaporized to leak out of the cell due to the abnormal rise of the cell temperature. Furthermore, it is another object of the invention to provide a non-aqueous electrolyte cell and a polymer cell comprising the non-aqueous electrolyte for the cell or the electrolyte for the polymer cell, in which the risk of ignition and so on in the cell and out of the cell is reduced when the temperature rises abnormally.

The inventors have made various studies in order to achieve the above objects and discovered that in a non-aqueous electrolyte for a cell comprising at least one aprotic organic solvent or an electrolyte for a polymer cell comprising a polymer and at least one aprotic organic solvent, it is possible to largely reduce the risk of ignition-fire on the aprotic organic solvent retained in the cell and the aprotic organic solvent leaking out of the cell through evaporation or the like by adding a phosphorus and/or nitrogen containing compound having a boiling point near to that of the respective aprotic organic solvent, and as a result the invention has been accomplished.

That is, the non-aqueous electrolyte for the cell according to the invention is a non-aqueous electrolyte for a cell comprising at least one aprotic organic solvent and a support salt, which further includes a compound containing phosphorus and/or nitrogen in its molecule and having a difference of a boiling point from that of the respective aprotic organic solvent of not more than 25° C.

In a preferable embodiment of the non-aqueous electrolyte for the cell according to the invention, the compound containing phosphorus and/or nitrogen in its molecule has a phosphorus-nitrogen double bond. As the compound containing phosphorus and/or nitrogen in its molecule and having the phosphorus-nitrogen double bond is particularly preferable a phosphazene compound.

In another preferable embodiment of the non-aqueous electrolyte for the cell according to the invention, the aprotic organic solvent is at least one selected from the group consisting of ethylene carbonate, propylene carbonate, diethyl carbonate, dimethyl carbonate, ethyl methyl carbonate and methyl formate. This non-aqueous electrolyte is particularly preferable for a non-aqueous electrolyte secondary cell.

In the other preferable embodiment of the non-aqueous electrolyte for the cell according to the invention, the aprotic organic solvent is at least one selected from the group consisting of propylene carbonate, 1,2-dimethoxy ethane and γ-butyrolactone. This non-aqueous electrolyte is particularly preferable for a non-aqueous electrolyte primary cell.

Also, the non-aqueous electrolyte cell according to the invention comprises the above-described non-aqueous electrolyte, a positive electrode and a negative electrode.

Moreover, the electrolyte for the polymer cell according to the invention is an electrolyte for a polymer cell comprising at least one aprotic organic solvent, a polymer and a support salt, which further includes a compound containing phosphorus and/or nitrogen in its molecule and having a difference of a boiling point from that of the respective aprotic organic solvent of not more than 25° C.

In a preferable embodiment of the electrolyte for the polymer cell according to the invention, the compound containing phosphorus and/or nitrogen in its molecule has a phosphorus-nitrogen double bond. As the compound containing phosphorus and/or nitrogen in its molecule and having the phosphorus-nitrogen double bond is particularly preferable a phosphazene compound.

In another preferable embodiment of the electrolyte for the polymer cell according to the invention, the aprotic organic solvent is at least one selected from the group consisting of ethylene carbonate, propylene carbonate, diethyl carbonate, dimethyl carbonate, ethyl methyl carbonate and methyl formate.

Furthermore, the polymer cell according to the invention comprises the above-described electrolyte, a positive electrode and a negative electrode.

According to the invention, there can be provided a non-aqueous electrolyte for a cell comprising at least one aprotic organic solvent, in which the risk of igniting-firing the aprotic organic solvent retained in the cell or leaking out of the cell is highly reduced by further adding a phosphorus and/or nitrogen containing compound having a boiling point near to that of the respective aprotic organic solvent. Also, there can be provided a non-aqueous electrolyte cell comprising the above non-aqueous electrolyte, in which the risk of ignition and so on in the cell and out of the cell is highly reduced even if the temperature rises abnormally.

Moreover, according to the invention, there can be provided an electrolyte for a polymer cell comprising a polymer and at least one aprotic organic solvent, in which the risk of igniting-firing the aprotic organic solvent retained in the cell and leaking out of the cell is highly reduced by further adding a phosphorus and/or nitrogen containing compound having a boiling point near to that of the respective aprotic organic solvent. Also, there can be provided a polymer cell comprising the above electrolyte, in which the risk of ignition and so on in the cell and out of the cell is highly reduced even if the temperature rises abnormally.

BEST MODE FOR CARRYING OUT THE INVENTION

Non-Aqueous Electrolyte for Cell and Electrolyte for Polymer Cell

The non-aqueous electrolyte for the cell and the electrolyte for the polymer cell according to the invention will be described in detail below. The non-aqueous electrolyte for the cell according to the invention comprises at least one aprotic organic solvent and a support salt, and further includes a compound containing phosphorus and/or nitrogen in its molecule and having a difference of a boiling point from that of the respective aprotic organic solvent of not more than 25° C. Also, the electrolyte for the polymer cell according to the invention comprises at least one aprotic organic solvent, a polymer and a support salt, and further includes a compound containing phosphorus and/or nitrogen in its molecule and having a difference of a boiling point from that of the respective aprotic organic solvent of not more than 25° C.

In the non-aqueous electrolyte for the cell and the electrolyte for the polymer cell of the invention, the compound containing phosphorus and/or nitrogen in its molecule has a function of generating nitrogen gas and/or phosphate ester and so on to render the non-aqueous electrolyte for the cell or the electrolyte for the polymer cell into non-combustibility, flame retardance or self-extinguishing property to thereby reduce the risk of ignition or the like of the cell. However, when the non-aqueous electrolyte containing the aprotic organic solvent does not contain a phosphorus and/or nitrogen containing compound having a boiling point near to that of the aprotic organic solvent, a range of temperature that the aprotic organic solvent does not coexist with the phosphorus and/or nitrogen containing compound is wide in either of a gas phase and a liquid phase, so that it is impossible to reduce the risk of igniting-firing the evaporated aprotic organic solvent or the aprotic organic solvent retained in the cell when the temperature of the cell rises abnormally. Moreover, when the electrolyte for the polymer cell containing the aprotic organic solvent does not contain the phosphorus and/or nitrogen containing compound having a boiling point near to that of the aprotic organic solvent, a range of temperature that the aprotic organic solvent does not coexist with the phosphorus and/or nitrogen containing compound is wide in either of a gas phase and the electrolyte (gel), so that it is impossible to reduce the risk of igniting-firing the evaporated aprotic organic solvent or the aprotic organic solvent retained in the cell when the temperature of the polymer cell rises abnormally.

On the contrary, the non-aqueous electrolyte for the cell according to the invention comprises an aprotic organic solvent and a phosphorus and/or nitrogen containing compound having a boiling point near to that of the aprotic organic solvent, so that when the temperature of the cell rises abnormally, the aprotic organic solvent and the phosphorus and/or nitrogen containing compound vaporize in a similar temperature, and even when the aprotic organic solvent exists as a gas or a liquid, the aprotic organic solvent coexists with the phosphorus and/or nitrogen containing compound, and as a result, the risk of igniting-firing the non-aqueous electrolyte is highly reduced. Moreover, the electrolyte for the polymer cell of the invention comprises an aprotic organic solvent and a phosphorus and/or nitrogen containing compound having a boiling point near to that of the aprotic organic solvent, so that when the temperature of the polymer cell rises abnormally, the aprotic organic solvent and the phosphorus and/or nitrogen containing compound vaporize in a similar temperature, and even when the aprotic organic solvent exists in the electrolyte or as a gas, the aprotic organic solvent coexists with the phosphorus and/or nitrogen containing compound, and as a result, the risk of igniting-firing the electrolyte is highly reduced.

Furthermore, when the non-aqueous electrolyte or the electrolyte for the polymer cell according to the invention contains, for example, an aprotic organic solvent having a low boiling point and another aprotic organic solvent having a high boiling point, the phosphorus and/or nitrogen containing compound corresponding to the aprotic organic solvent having the low boiling point vaporizes at a temperature near to the vaporization of such a low-boiling aprotic organic solvent, so that it is possible to reduce the risk of igniting-firing the vaporized aprotic organic solvent. Even after the vaporization of the low-boiling aprotic organic solvent and the phosphorus and/or nitrogen containing compound having a boiling point near to that of the low-boiling aprotic organic solvent, the high-boiling aprotic organic solvent and the phosphorus and/or nitrogen containing compound having a boiling point near to that of the high-boiling aprotic organic solvent exist in the non-aqueous electrolyte or the electrolyte for the polymer cell, so that it is possible to reduce the risk of igniting-firing the remaining high-boiling aprotic organic solvent.

The non-aqueous electrolyte for the cell and the electrolyte for the polymer cell according to the invention contain at least one aprotic organic solvent. The aprotic organic solvent can easily improve an ionic conductivity of the non-aqueous electrolyte or the electrolyte for the polymer cell without reacting with the negative electrode. As the aprotic organic solvent can be preferably mentioned esters such as dimethyl carbonate (DMC), diethyl carbonate (DEC), diphenyl carbonate, ethyl methyl carbonate (EMC), ethylene carbonate (EC), propylene carbonate (PC), γ-butyrolactone (GBL), γ-valerolactone, methyl formate (MF) and so on; and ethers such as 1,2-dimethoxy ethane (DME), tetrahydrofuran (THF) and so on. Among them, propylene carbonate, 1,2-dimethoxy ethane and γ-butyrolactone are preferable as the aprotic organic solvent for the non-aqueous electrolyte of the primary cell, and ethylene carbonate, propylene carbonate, diethyl carbonate, dimethyl carbonate, ethyl methyl carbonate and methyl formate are preferable as the aprotic organic solvent for the non-aqueous electrolyte of the secondary cell and the electrolyte for the polymer cell. Moreover, cyclic esters are preferable in a point that the dielectric constant is high and the solubility of the support salt is excellent, while chain esters and chain ethers are preferable in a point that the viscosity of the electrolyte is made low and the impregnation into the polymer is easy. These aprotic organic solvents may be used alone or in a combination of two or more.

The non-aqueous electrolyte for the cell and the electrolyte for the polymer cell according to the invention contain a support salt. As the support salt is preferable a support salt serving as an ion source for a lithium ion. The support salt is not particularly limited, but preferably includes lithium salts such as $LiClO_4$, $LiBF_4$, $LiPF_6$, $LiCF_3SO_3$, $LiAsF_6$, $LiC_4F_9SO_3$, $Li(CF_3SO_2)_2N$, $Li(C_2F_5SO_2)_2N$ and so on. These support salts may be used alone or in a combination of two or more.

The concentration of the support salt in the non-aqueous electrolyte for the cell according to the invention is preferably 0.2-1.5 mol/L (M), more preferably 0.5-1 mol/L (M). When the concentration of the support salt is less than 0.2 mol/L (M), the electric conductivity of the electrolyte cannot be sufficiently ensured and troubles may be caused in the discharge property and the charge property of the cell, while when it exceeds 1.5 mol/L (M), the viscosity of the electrolyte rises and the sufficient mobility of the lithium ion cannot be ensured, and hence the sufficient electric conductivity of the electrolyte cannot be ensured and troubles may be caused in the discharge property and the charge property of the cell likewise the above-mentioned case.

Furthermore, the electrolyte for the polymer cell according to the invention contains a polymer. As the polymer can be used any polymers usually used in the polymer cell, and are concretely mentioned polyethylene oxide, polyacrylate, polypropylene oxide, polyacrylonitrile, polyacrylate containing ethylene oxide unit and so on. Among them, polyethylene oxide and polypropylene oxide are particularly preferable in a point that they are electrically stable. These polymers may be used alone or in a combination of two or more. Moreover, the weight average molecular weight (Mw) of the polymer is preferably not less than 100,000, more preferably not less than 5,000,000. When the weight average molecular weight of the polymer is less than 100,000, the strength is low and a sol state may be taken rather than gel. In the electrolyte for the polymer cell according to the invention, the amount of the polymer to the total amount of the polymer and the support salt is preferably 80-95% by mass, more preferably about 90% by mass. When the amount of the polymer is less than 80% by mass, the strength of the electrolyte lowers, while when it exceeds 95% by mass, the electric conductivity may lower.

The non-aqueous electrolyte for the cell and the electrolyte for the polymer cell according to the invention contain a compound having a difference of a boiling point from that of the aprotic organic solvent contained in the non-aqueous electrolyte or the electrolyte for the polymer cell of not more than 25° C. and containing phosphorus and/or nitrogen in its molecule. When the difference of the boiling point between the aprotic organic solvent contained in the non-aqueous electrolyte or the electrolyte for the polymer cell and the phosphorus and/or nitrogen containing compound is more than 25° C., there is a high risk that the aprotic organic solvent is early vaporized to ignite the gaseous aprotic organic solvent, or the phosphorus and/or nitrogen containing compound is early vaporized to ignite the aprotic organic solvent retained in the non-aqueous electrolyte or the electrolyte for the polymer cell. From a viewpoint that the risk of ignition of the aprotic organic solvent is further reduced, the difference of the boiling point between the aprotic organic solvent and the phosphorus and/or nitrogen containing compound is preferably not more than 20° C. Moreover, the non-aqueous electrolyte for the cell and the electrolyte for the polymer cell according to the invention is sufficient to contain at least the phosphorus and/or nitrogen containing compound having the difference of the boiling point from that of the respective aprotic organic solvent of not more than 25° C. and may further contain a phosphorus and/or nitrogen containing compound having the difference of the boiling point from that of the aprotic organic solvent of more than 25° C.

As the compound containing phosphorus and/or nitrogen in its molecule are mentioned compounds containing phosphorus in the molecule such as phosphate ester compounds, polyphosphate ester compounds, condensed phosphate ester compounds and so on; compounds containing nitrogen in the molecule such as triazine compounds, guanidine compounds, pyrrolidine compounds and so on; compounds containing phosphorus and nitrogen in the molecule such as phosphazene compounds, isomers of the phosphazene compounds, phosphazane compounds, composite compounds of the aforementioned compound containing phosphorus in the molecule and the aforementioned compound containing nitrogen in the molecule and so on. Moreover, the phosphorus and nitrogen containing compound is naturally an example of the compound containing phosphorus in the molecule and an example of the compound containing nitrogen in the molecule. The phosphorus and/or nitrogen containing compound is properly selected in accordance with the aprotic organic solvent used in the non-aqueous electrolyte or the electrolyte for the polymer cell.

Among the phosphorus and/or nitrogen containing compounds, a compound containing phosphorus and nitrogen in the molecule is preferable from a viewpoint of the cycle property of the secondary cell and the polymer cell. Among the compounds containing phosphorus and nitrogen in the molecule, a compound having a phosphorus-nitrogen double bond such as phosphazene compound or the like is particularly preferable in view of improving the thermal stability and the high-temperature storing property of the cell.

Concretely, as the phosphazene compound are mentioned a chain phosphazene compound represented by the following formula (I) and a cyclic phosphazene compound represented by the following formula (II):

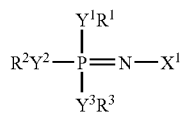
(I)

(wherein $R^1$, R2 and $R^3$ are independently a monovalent substituent or a halogen element; $X^1$ is a substituent containing at least one selected from the group consisting of carbon, silicon, germanium, tin, nitrogen, phosphorus, arsenic, antimony, bismuth, oxygen, sulfur, selenium, tellurium and polonium; and $Y^1$, $Y^2$ and $Y^3$ are independently a bivalent connecting group, a bivalent element or a single bond)

$(NPR^4{}_2)_n$ (II)

(wherein $R^4$s are independently a monovalent substituent or a halogen element; and n is 3-15).

Among the phosphazene compounds represented by the formula (I) or (II), compounds being liquid at 25° C. (room temperature) are preferable. The viscosity of the liquid phosphazene compound is preferably not more than 300 mPa·s (300 cP), more preferably not more than 20 mPa·s (20 cP), particularly not more than 5 mPa·s (5 cP). Moreover, the viscosity in the invention is determined by using a viscosity measuring meter (R-type viscometer Model RE500-SL, made by Toki Sangyo Co., Ltd.) and conducting the measurement at each revolution rate of 1 rpm, 2 rpm, 3 rpm, 5 rpm, 7 rpm, 10 rpm, 20 rpm and 50 rpm for 120 seconds to measure a viscosity at such a revolution rate that an indication value is 50-60% as an analytical condition. When the viscosity at 25° C. of the phosphazene compound exceeds 300 mPa·s (300 cP), the support salt is hardly dissolved, and the wettability to a positive electrode material, a negative electrode material, a separator, a dry gel comprising the polymer and the support salt and the like lowers, and the ion conductivity of the non-aqueous electrolyte or the electrolyte for the polymer cell is considerably lowered and particularly performances are lacking in the use under a lower temperature condition of not higher than freezing point or the like. Moreover, these phosphazene compounds are liquid, so that they have an electric conductivity equal to that of a usual liquid electrolyte and show an excellent cycle property when they are used in the electrolyte for the secondary cell or the electrolyte for the polymer cell.

In the formula (I), $R^1$, R2 and $R^3$ are not particularly limited as far as they are a monovalent substituent or a halogen element. As the monovalent substituent are mentioned an alkoxy group, an alkyl group, a carboxyl group, an acyl group, an aryl group and the like. Among them, the alkoxy group is preferable in a point that the viscosity of the phosphazene compound is low. On the other hand, as the halogen element are preferably mentioned fluorine, chlorine, bromine and the like. All of $R^1$-$R^3$ may be the same kind of the substituent, or some of them may be different kinds of substituents. As the alkoxy group are mentioned, for example, methoxy group, ethoxy group, propoxy group, butoxy group, and alkoxy-substituted alkoxy groups such as methoxy ethoxy group, methoxy ethoxy ethoxy group and the like. Among them, methoxy group, ethoxy group, methoxy ethoxy group and methoxy ethoxy ethoxy group are preferable, and methoxy group and ethoxy group are particularly preferable from a viewpoint of low viscosity and high dielectric constant. As the alkyl group are mentioned methyl group, ethyl group, propyl group, butyl group, pentyl group and the like. As the acyl group are mentioned formyl group, acetyl group, propionyl group, butylyl group, isobutylyl group, valeryl group and the like. As the aryl group are mentioned phenyl group, tolyl group, naphthyl group and the like. In these monovalent substituents, a hydrogen element is preferable to be substituted with a halogen element. As the halogen element are preferable fluorine, chlorine and bromine, and fluorine is most preferable and chlorine is second most preferable. The monovalent substituent in which a hydrogen element is substituted with fluorine tends to be large in the effect of improving the cycle characteristic of the secondary cell and the polymer cell as compared with the chlorine substitution.

In the formula (I), as the bivalent connecting group represented by $Y^1$, $Y^2$ and $Y^3$ are mentioned, for example, $CH_2$ group and a bivalent connecting group containing at least one element selected from the group consisting of oxygen, sulfur, selenium, nitrogen, boron, aluminum, scandium, gallium, yttrium, indium, lanthanum, thallium, carbon, silicon, titanium, tin, germanium, zirconium, lead, phosphorus, vanadium, arsenic, niobium, antimony, tantalum, bismuth, chromium, molybdenum, tellurium, polonium, tungsten, iron, cobalt and nickel. Among them, $CH_2$ group and the bivalent connecting group containing at least one element selected from the group consisting of oxygen, sulfur, selenium and nitrogen are preferable, and the bivalent connecting group containing sulfur and/or selenium is particularly preferable. Also, $Y^1$, $Y^2$ and $Y^3$ may be a bivalent element such as oxygen, sulfur, selenium or the like, or a single bond. All of $Y^1$-$Y^3$ may be the same kind, or some of them may be different kinds from each other.

In the formula (I), as $X^1$ is preferable a substituent containing at least one element selected from the group consisting of carbon, silicon, nitrogen, phosphorus, oxygen and sulfur from a viewpoint of the harmfulness, environment-friendliness and the like. Among these substituents, a substituent having a structure represented by the following formula (III), (IV) or (V) is more preferable.

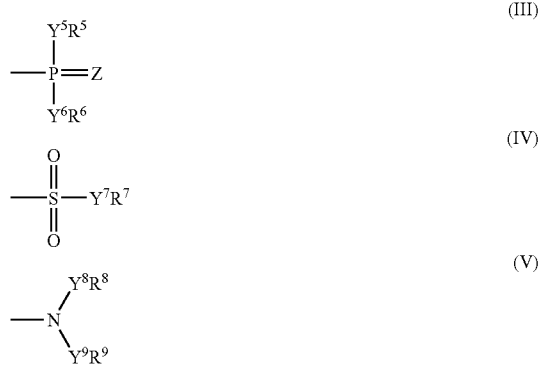

[In the formulae (III), (IV) and (V), $R^5$-$R^9$ are independently a monovalent substituent or a halogen element; $Y^5$-$Y^9$ are independently a bivalent connecting group, a bivalent element or a single bond; and Z is a bivalent group or a bivalent element.]

In the formulae (III), (IV) and (V), as $R^5$-$R^9$ are preferably mentioned the same monovalent substituents or halogen elements as described in $R^1$-$R^3$ of the formula (I). Also, they may be the same kind in the same substituent, or some of them may be different kinds from each other. $R^5$ and $R^6$ in the formula (III), and $R^8$ and $R^9$ in the formula (V) may be bonded with each other to form a ring.

In the formulae (III), (IV) and (V), as the group represented by $Y^5$-$Y^9$ are mentioned the same bivalent connecting groups, bivalent elements or the like as described in $Y^1$-$Y^3$ of the formula (I). Similarly, the group containing sulfur and/or selenium is particularly preferable because the risk of igniting-firing the non-aqueous electrolyte and the electrolyte for the polymer cell is reduced. They may be the same kind in the same substituent, or some of them may be different kinds from each other.

As Z in the formula (III) are mentioned, for example, $CH_2$ group, CHR group (R is an alkyl group, an alkoxyl group, a phenyl group or the like, and so forth), NR group, and a bivalent group containing at least one element selected from the group consisting of oxygen, sulfur, selenium, boron, aluminum, scandium, gallium, yttrium, indium, lanthanum, thallium, carbon, silicon, titanium, tin, germanium, zirconium, lead, phosphorus, vanadium, arsenic, niobium, antimony, tantalum, bismuth, chromium, molybdenum, tellurium, polonium, tungsten, iron, cobalt and nickel. Among them, $CH_2$ group, CHR group, NR group and the bivalent group containing at least one element selected from the group consisting of oxygen, sulfur and selenium are preferable. Particularly, the group containing sulfur and/or selenium is preferable because the risk of igniting-firing the non-aqueous electrolyte and the electrolyte for the polymer cell is reduced. Also, Z may be a bivalent element such as oxygen, sulfur, selenium or the like.

Among such substituents, a phosphorus-containing substituent as shown by the formula (III) is particularly preferable in a point that the risk of ignition-firing can be effectively reduced. Also, when the substituent is a sulfur-containing substituent as shown by the formula (IV), it is particularly preferable in a point that the interfacial resistance of the non-aqueous electrolyte and the electrolyte for the polymer cell is made small.

In the formula (II), $R^4$ is not particularly limited as far as it is a monovalent substituent or a halogen element. As the monovalent substituent are mentioned an alkoxy group, an alkyl group, a carboxyl group, an acyl group, an aryl group and the like. Among them, the alkoxy group is preferable in a point that the viscosity of the phosphazene compound is low. On the other hand, as the halogen element are preferably mentioned fluorine, chlorine, bromine and the like. As the alkoxy group are mentioned methoxy group, ethoxy group, methoxy ethoxy group, propoxy group, phenoxy group and the like. Among them, methoxy group, ethoxy group, n-propoxy group, phenoxy group are particularly preferable in case of using in the non-aqueous electrolyte primary cell, while methoxy group, ethoxy group, methoxy ethoxy group and phenoxy group are particularly preferable in case of using in the non-aqueous electrolyte secondary cell and the polymer cell. In these monovalent substituents, a hydrogen element is preferable to be substituted with a halogen element. As the halogen element are preferably mentioned fluorine, chlorine, bromine and the like. As a substituent substituted with fluorine is mentioned, for example, trifluoroethoxy group.

It is possible to obtain a phosphazene compound having a more preferable viscosity, a solubility suitable for addition and mixing and the like by properly selecting $R^1$-$R^9$, $Y^1$-$Y^3$, $Y^5$-$Y^9$ and Z in the formulae (I)-(V). These phosphazene compounds may be used alone or in a combination of two or more.

Among the phosphazene compounds of the formula (II), a phosphazene compound represented by the following formula (VI) is particularly preferable from a viewpoint that the viscosity of the non-aqueous electrolyte is made low to improve the low-temperature characteristic of the cell and further improve the degradation proof and the safety of the non-aqueous electrolyte, and another viewpoint that the low-temperature characteristic of the polymer cell is improved and the degradation proof and the safety of the electrolyte for the polymer cell are improved:

(wherein n is 3-13).

The phosphazene compound represented by the formula (VI) is a low viscosity liquid at room temperature (25° C.) and has a function of depressing a freezing point. Therefore, the viscosity of the non-aqueous electrolyte can be lowered by adding the phosphazene compound of the formula (VI) to the non-aqueous electrolyte or the electrolyte for the polymer cell, which is possible to give excellent low-temperature characteristics to the non-aqueous electrolyte or the electrolyte for the polymer cell, and also there can be provided a non-aqueous electrolyte cell and a polymer cell having a low internal resistance and a high electric conductivity. For this end, it is possible to provide a non-aqueous electrolyte cell and a polymer cell developing an excellent discharge characteristic over a long time even if it is particularly used under a low-temperature condition in low-temperature areas or season.

In the formula (VI), n is preferably 3-5, more preferably 3-4, particularly 3 in a point that the viscosity of the non-aqueous electrolyte can be made low and the excellent low-temperature characteristics can be given to the non-aqueous electrolyte and the electrolyte for the polymer cell. When the value of n is small, the boiling point is low and a property of preventing ignition in the approaching to a flame can be improved. While, as the value of n becomes large, the boiling point becomes high and the electrolyte can be stably used even at a high temperature. In order to obtain desired performances utilizing the above nature, it is possible to properly select and use plural phosphazene compounds.

By properly selecting the value of n in the formula (VI), it is possible to obtain a phosphazene compound having a more preferable viscosity, a solubility suitable for mixing, low-temperature characteristics and the like. These phosphazene compounds may be used alone or in a combination of two or more.

The viscosity of the phosphazene compound represented by the formula (VI) is not particularly limited as far as it is not more than 20 mPa·s (20 cP), but it is preferably not more than 10 mPa·s (10 cP), more preferably not more than 5 mPa·s (5 cP) from a viewpoint of the improvements of the electric conduction and low-temperature characteristic.

Among the phosphazene compounds of the formula (II), a phosphazene compound represented by the following formula (VII) is particularly preferable from a viewpoint that the safety and the degradation proof of the non-aqueous electrolyte and the electrolyte for the polymer cell are improved:

$$(NPR^{10}{}_2)_n \quad (VII)$$

(wherein $R^{10}$s are independently a monovalent substituent or a fluorine, and at least one of all $R^{10}$s is a fluorine-containing monovalent substituent or a fluorine, and n is 3-8, provided that all $R^{10}$s are not fluorine).

When the phosphazene compound of the formula (II) is included, the excellent self-extinguishing property or flame retardance can be given to the non-aqueous electrolyte and the electrolyte for the polymer cell to improve the safety of the non-aqueous electrolyte and the electrolyte for the polymer cell. When using a phosphazene compound represented by the formula (VII) in which at least one of all $R^{10}$s is a fluorine-containing monovalent substituent, it is possible to give a more excellent safety to the non-aqueous electrolyte and the electrolyte for the polymer cell. Furthermore, when using a phosphazene compound represented by the formula (VII) in which at least one of all $R^{10}$s is fluorine, it is possible to give an even more excellent safety. That is, the phosphazene compound represented by the formula (VII) in which at least one of all $R^{10}$s is a fluorine-containing monovalent substituent or fluorine has an effect of hardly burning the non-aqueous electrolyte and the electrolyte for the polymer cell as compared with the phosphazene compound containing no fluorine, and a further excellent safety can be given to the non-aqueous electrolyte and the electrolyte for the polymer cell.

As the monovalent substituent in the formula (VII) are mentioned an alkoxy group, an alkyl group, an acyl group, an aryl group, a carboxyl group and the like, and the alkoxy group is preferable in a point that the improvement of the safety of the non-aqueous electrolyte and the electrolyte for the polymer cell is excellent. As the alkoxy group are mentioned methoxy group, ethoxy group, n-propoxy group, i-propoxy group, butoxy group, and an alkoxy group substituted alkoxy group such as methoxyethoxy group or the like. Particularly, methoxy group, ethoxy group and n-propoxy group are preferable in a point that the improvement of the safety of the non-aqueous electrolyte and the electrolyte for the polymer cell is excellent. Also, methoxy group is preferable in a point that the viscosity of the non-aqueous electrolyte is made low.

In the formula (VII), n is preferably 3-5, more preferably 3-4 in a point that the excellent safety can be given to the non-aqueous electrolyte and the electrolyte for the polymer cell.

The monovalent substituent is preferable to be substituted with fluorine, and if all of $R^{10}$s in the formula (VII) are not fluorine, at least one monovalent substituent contains fluorine.

The content of fluorine in the phosphazene compound of the formula (VII) is preferably 3-70% by mass, more preferably 7-45% by mass. When the content of fluorine is 3-70% by mass, "excellent safety" can be preferably given to the non-aqueous electrolyte and the electrolyte for the polymer cell.

The phosphazene compound of the formula (VII) may contain a halogen element such as chlorine, bromine or the like in addition to fluorine. However, fluorine is most preferable, and chlorine is second most preferable. The fluorine containing compound tends to have a large effect of improving the cycle characteristic of the secondary cell and the polymer cell as compared with the chlorine containing compound.

By properly selecting $R^{10}$s and the value of n in the formula (VII), it is possible to obtain a phosphazene compound having more preferable safety and viscosity, a solubility suitable for mixing and the like. These phosphazene compounds may be used alone or in a combination of two or more.

The viscosity of the phosphazene compound of the formula (VII) is not particularly limited as far as it is not more than 20 mPa·s, but it is preferably not more than 10 mPa·s, more preferably not more than 5 mPa·s from a viewpoint of the improvements of the electric conduction and low-temperature characteristics.

Among the phosphazene compounds of the formula (II), a phosphazene compound being a solid at 25° C. (room temperature) and represented by the following formula (VIII) is preferable from a viewpoint that the safety of the non-aqueous electrolyte and the electrolyte for the polymer cell is improved with suppressing the viscosity rise of the non-aqueous electrolyte:

$$(NPR^{11}{}_2)_n \quad (VIII)$$

(wherein $R^{11}$s are independently a monovalent substituent or a halogen element; and n is 3-6).

As the phosphazene compound represented by the formula (VIII) is a solid at room temperature (25° C.), when it is added to the electrolyte, it is dissolved in the electrolyte to raise the viscosity of the electrolyte. However, if the addition amount is a given value, a ratio of raising the viscosity of the electrolyte is low and there is provided a non-aqueous electrolyte cell having a low internal resistance and a high electric conductivity. Also, the phosphazene compound of the formula (VIII) is dissolved in the electrolyte, so that the long-life stability of the non-aqueous electrolyte is excellent.

Moreover, as the phosphazene compound represented by the formula (VIII) is hardly vaporized, it remains in the electrolyte even if the temperature of the polymer cell becomes very high, and it can suppress the burning of the polymer constituting the electrolyte, and as a result, the safety of the polymer cell can be significantly improved. Also, the phosphazene compound of the formula (VIII) can improve the long-life stability of the electrolyte for the polymer cell.

In the formula (VIII), $R^{11}$ is not particularly limited as far as it is a monovalent substituent or a halogen element. As the monovalent substituent are mentioned an alkoxy group, an alkyl group, a carboxyl group, an acyl group, an aryl group and the like. As the halogen element are preferably mentioned fluorine, chlorine, bromine, iodine and the like. Among them, when it is used for the non-aqueous electrolyte, the alkoxy group is particularly preferable in a point that the viscosity rise of the electrolyte can be suppressed. Also, when it is used for the electrolyte for the polymer cell, the alkoxy group is particularly preferable in a point that when it is dissolved in the aprotic organic solvent, the viscosity rise of the solution can be suppressed. Moreover, as the viscosity of the mixed solution of the phosphazene compound of the formula (VIII) and the aprotic organic solvent rises, the penetrability of the mixed solution into the dry gel comprising the polymer and the support salt is deteriorated, so that the viscosity of the mixed solution is preferably as low as possible. As the alkoxy group are preferable methoxy group, ethoxy group, methoxy ethoxy group, propoxy group (i-propoxy group, n-propoxy group), phenoxy group, trifluoroethoxy group and the like, and methoxy group, ethoxy group, propoxy group (i-propoxy group, n-propoxy group), phenoxy group and trifluoroethoxy group are more preferable in a point that the viscosity rise can be suppressed. The monovalent substituent is preferable to contain the above halogen element. In the formula (VIII), n is particularly preferable to be 3 or 4 in a point that the viscosity rise of the mixed solution with the aprotic organic solvent can be suppressed.

As the phosphazene compound of the formula (VIII) are particularly preferable a structure in which $R^{11}$s are methoxy group and n is 3 in the formula (VIII), a structure in which $R^{11}$s are at least either methoxy group or phenoxy group and n is 4 in the formula (VIII), a structure in which $R^{11}$s are ethoxy group and n is 4 in the formula (VIII), a structure in which $R^{11}$s are i-propoxy group and n is 3 or 4 in the formula (VIII), a structure in which $R^{11}$s are n-propoxy group and n is 4 in the formula (VIII), a structure in which $R^{11}$s are trifluoroethoxy group and n is 3 or 4 in the formula (VIII), and a structure in which $R^{11}$s are phenoxy group and n is 3 or 4 in the formula (VIII) in a point that the viscosity rise of the mixed solution with the aprotic organic solvent can be suppressed.

By properly selecting each substituent and value of n in the formula (VIII), it is possible to adjust the viscosity of the mixed solution of the aprotic organic solvent and the phosphazene compound and so on. These phosphazene compounds may be used alone or in a combination of two or more.

As the isomer of the phosphazene compound is concretely mentioned a compound represented by the following formula (IX). The compound of the formula (IX) is the isomer of the phosphazene compound represented by the following formula (X).

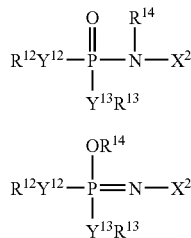

[In the formulae (IX) and (X), $R^{12}$, $R^{13}$ and $R^{14}$ are independently a monovalent substituent or a halogen element; and $X^2$ is a substituent containing at least one element selected from the group consisting of carbon, silicon, germanium, tin, nitrogen, phosphorus, arsenic, antimony, bismuth, oxygen, sulfur, selenium, tellurium and polonium; and $Y^{12}$ and $Y^{13}$ are independently a bivalent connecting group, a bivalent element or a single bond.]

In the formula (IX), $R^{12}$, $R^{13}$ and $R^{14}$ are not particularly limited as far as they are the monovalent substituent or the halogen element, and preferably include the same monovalent substituents and halogen elements as mentioned in $R^1$-$R^3$ of the formula (I). Also, as the bivalent connecting group or bivalent element shown by $Y^{12}$ and $Y^{13}$ in the formula (IX) are preferably mentioned the same bivalent connecting groups or bivalent elements as mentioned in $Y^1$-$Y^3$ of the formula (I). Moreover, as the substituent represented by $X^2$ in the formula (IX) are preferably mentioned the same substituents as mentioned in $X^1$ of the formula (I).

The isomer represented by the formula (IX) and of the phosphazene compound represented by the formula (X) can give excellent low-temperature characteristics to the non-aqueous electrolyte and the electrolyte for the polymer cell when it is added to the non-aqueous electrolyte and the electrolyte for the polymer cell, and can improve the degradation proof and the safety of the non-aqueous electrolyte and the electrolyte for the polymer cell.

The isomer represented by the formula (IX) is an isomer of the phosphazene compound represented by the formula (X), and can be produced by adjusting a vacuum degree and/or a temperature in the formation of the phosphazene compound of the formula (X). Also, the content of the isomer of the phosphazene compound (% by volume) can be measured by a gel permeation chromatography (GPC) or a high-speed liquid chromatography (HPLC).

As the phosphate ester are concretely mentioned alkyl phosphates such as triphenyl phosphate and so on; tricresyl phosphate, tris(fluoroethyl) phosphate, tris(fluoroneopentyl) phosphate, alkoxy phosphates and derivatives thereof.

In the non-aqueous electrolyte for the cell according to the invention, the content of the above-mentioned compound containing phosphorus and/or nitrogen in its molecule is preferably not less than 3% by mass, more preferably not less than 5% by mass in a point that the safety of the electrolyte is improved.

Also, in the electrolyte for the polymer cell according to the invention, the content of the above-mentioned compound containing phosphorus and/or nitrogen in its molecule is preferably not less than 0.5% by mass, more preferably not less than 1% by mass, and even more preferably 2.5% by mass in a point that the safety of the electrolyte is improved.

The method of preparing the electrolyte for the polymer cell according to the invention is not particularly limited, but includes a method wherein the polymer and the support salt are mixed at a mass ratio (polymer/support salt) of 9/1 and added and uniformly mixed with a volatile solvent and uniformly dissolved at about 80° C. and heated to about 40° C. under vacuum to vaporize the volatile solvent and dried and impregnated and swollen with a mixed solution of the aprotic organic solvent and the compound containing phosphorus and/or nitrogen in its molecule to obtain the electrolyte. As the volatile solvent are mentioned acetonitrile, alcohols and the like. Acetonitrile is preferable in a point of excellent solubility and the like.

As the form of the electrolyte for the polymer cell of the invention is preferable a gel electrolyte obtained by impregnating and swelling the dry gel containing the polymer and the support salt with the mixed solution of the aprotic organic solvent and the compound containing phosphorus and/or nitrogen in its molecule, more preferably a gel electrolyte obtained by impregnating and swelling the dry gel containing the polymer and the support salt with the mixed solution of at least one aprotic organic solvent and the compound containing phosphorus and/or nitrogen in its molecule and having a difference of a boiling point from that of the respective aprotic organic solvent of not more than 25° C. Moreover, the form of the electrolyte for the polymer cell of the invention is not particularly limited, but the sheet form or the like is preferable in a point of the thin-shaping of the polymer cell.

<Non-Aqueous Electrolyte Cell and Polymer Cell>

Then, the non-aqueous electrolyte and the polymer cell according to the invention will be described in detail. The non-aqueous electrolyte cell of the invention comprises the above-mentioned non-aqueous electrolyte for the cell, a positive electrode and a negative electrode, and is provided with other members usually used in the technical field of the non-aqueous electrolyte cell such as separator and the like, if necessary. Also, the polymer cell according to the invention comprises the above-mentioned electrolyte for the polymer cell, a positive electrode and a negative electrode, and is provided with other members usually used in the technical field of the polymer cell, if necessary.

Active materials for the positive electrode in the non-aqueous electrolyte cell of the invention partly differ between the primary cell and the secondary cell. For example, as the active material for the positive electrode of the non-aqueous electrolyte primary cell are preferably mentioned graphite fluoride [$(CF_x)_n$], $MnO_2$ (which may be synthesized electrochemically or chemically), $V_2O_5$, $MoO_3$, $Ag_2CrO_4$, CuO, CuS, $FeS_2$, $SO_2$, $SOCl_2$, $TiS_2$ and the like. Among them, $MnO_2$ and graphite fluoride are preferable because they are high in the capacity and the safety, high in the discharge potential and excellent in the wettability to the electrolyte. These active materials for the positive electrode may be used alone or in a combination of two or more. On the other hand, as the active material for the positive electrode of the non-aqueous electrolyte secondary cell are preferably mentioned metal oxides such as $V_2O_5$, $V_6O_{13}$, $MnO_2$, $MnO_3$ and the like; lithium-containing composite oxides such as $LiCoO_2$, $LiNiO_2$, $LiMn_2O_4$, $LiFeO_2$, $LiFePO_4$ and the like; metal sulfides such as $TiS_2$, $MoS_2$ and the like; electrically conductive polymers such as polyaniline and the like. The lithium-containing composite oxide may be a composite oxide containing two or three transition metals selected from the group consisting of Fe, Mn, Co and Ni. In this case, the composite oxide is represented by $LiFe_xCo_yNi_{(1-x-y)}O_2$ (wherein $0 \leq x<1$, $0 \leq y<1$, $0<x+y \leq 1$), $LiMn_xFe_yO_{2-x-y}$ or the like. Among them, $LiCoO_2$, $LiNiO_2$ and $LiMn_2O_4$ are particularly preferable because they are high in the capacity, high in the safety and excellent in the wettability to the electrolyte. These active materials for the positive electrode may be used alone or in a combination of two or more.

Also, the active material for the positive electrode in the polymer cell of the invention is not particularly limited, but can be properly selected from well-known active materials for the positive electrode. As the active material for the positive electrode are preferably mentioned metal oxides such as $V_2O_5$, $V_6O_{13}$, $MnO_2$, $MoO_3$ and the like; lithium-containing composite oxides such as $LiCoO_2$, $LiNiO_2$, $LiMn_2O_4$, $LiFeO_2$, $LiFePO_4$ and the like; metal sulfides such as $TiS_2$, $MoS_2$ and the like; electrically conductive polymers such as polyaniline and the like, and so on. The lithium-containing composite oxide may be a composite oxide containing two or three transition metals selected from the group consisting of Fe, Mn, Co and Ni. In this case, the composite oxide is represented by $LiFe_xCo_yNi_{(1-x-y)}O_2$ (wherein $0 \leq x<1$, $0 \leq y<1$, $0<x+y \leq 1$), $LiMn_xFe_yO_{2-x-y}$ or the like. Among them, $LiCoO_2$, $LiNiO_2$ and $LiMn_2O_4$ are particularly preferable because they are high in the capacity, high in the safety and excellent in the wettability to the electrolyte. These active materials for the positive electrode may be used alone or in a combination of two or more.

Active materials for the negative electrode in the non-aqueous electrolyte cell of the invention partly differ between the primary cell and the secondary cell. For example, as the active material for the negative electrode of the non-aqueous electrolyte primary cell are mentioned lithium metal itself, lithium alloys and the like. As a metal to be alloyed with lithium are mentioned Sn, Pb, Al, Au, Pt, In, Zn, Cd, Ag, Mg and the like. Among them, Al, Zn and Mg are preferable from a viewpoint of a greater amount of deposit and toxicity. These active materials for the negative electrode may be used alone or in a combination of two or more. On the other hand, as the active material for the negative electrode of the non-aqueous electrolyte secondary cell are preferably mentioned lithium metal itself, an alloy of lithium with Al, In, Pb, Zn or the like, a carbonaceous material such as graphite doped with lithium, and the like. Among them, the carbonaceous material such as graphite or the like is preferable and graphite is particularly preferable in a point that the safety is higher and the wettability of the electrolyte is excellent. As the graphite are mentioned natural graphite, artificial graphite, mesophase carbon micro bead (MCMB) and so on, further mentioned graphitizable carbon and non-graphitizable carbon. These active materials for the negative electrode may be used alone or in a combination of two or more.

Also, as an active material for the negative electrode of the polymer cell of the invention are preferably mentioned lithium metal itself, an alloy of lithium with Al, In, Pb, Zn or the like, a carbonaceous material such as graphite doped with lithium, and the like. Among them, the carbonaceous material such as graphite or the like is preferable and graphite is particularly preferable in a point that the safety is higher. At this point, as the graphite are mentioned natural graphite, artificial graphite, mesophase carbon micro bead (MCMB) and so on, further mentioned graphitizable carbon and non-graphitizable carbon. These active materials for the negative electrode may be used alone or in a combination of two or more.

The positive electrode and the negative electrode may be mixed with an electrically conducting agent and a binding agent, if necessary. As the electrically conducting agent are mentioned acetylene black and the like, and as the binding agent are mentioned polyvinylidene fluoride (PVDF), polytetrafluoroethylene (PTFE), styrene-butadiene rubber (SBR), carboxymethyl cellulose (CMC) and the like. These additives may be compounded in the same compounding ratio as in the conventional case. Concretely, when they are used for the positive electrode of the non-aqueous electrolyte primary cell, a mass ratio of the active material for the positive electrode:the binding agent:the electrically conducting agent is preferably 8:1:0.2-8:1:1, and when they are used for the positive and negative electrodes of the non-aqueous electrolyte secondary cell and the polymer cell, a mass ratio of the active material:the binding agent:the electrically conducting agent is preferably 94:3:3.

The forms of the positive and negative electrodes are not particularly limited, but can be properly selected from the well-known forms as the electrode. For example, there are mentioned a sheet form, a column form, a plate form, a spiral form and the like.

As the other member used in the non-aqueous electrolyte cell of the invention is mentioned a separator interposed between the positive and negative electrodes in the non-aqueous electrolyte cell and acting to prevent short-circuiting of current due to the contact between the electrodes. As a material of the separator are mentioned materials capable of surely preventing the contact between the electrodes and passing or impregnating the electrolyte such as non-woven fabrics, thin-layer films and the like made of synthetic resin such as polytetrafluoroethylene, polypropylene, polyethylene, cellulose based resin, polybutylene terephthalate, polyethylene terephthalate or the like. Among them, a microporous film having a thickness of about 20-50 μm and made of polypropylene or polyethylene, and a film made of cellulose based resin, polybutylene terephthalate, polyethylene terephthalate or the like are particularly preferable. In the invention, various well-known members usually used in the cell can be favorably used in addition to the above-mentioned separator.

As the other member used in the polymer cell of the invention are mentioned well-known various members usually used in the polymer cell.

The forms of the aforementioned non-aqueous electrolyte cell and the polymer cell according to the invention are not particularly limited, but there are preferably mentioned various well-known forms such as coin type, button type, paper type, cylindrical type of polygonal form or spiral structure and so on. In case of the button type, the non-aqueous electrolyte cell and the polymer cell can be made by preparing sheet-shaped positive and negative electrodes, and sandwiching the separator between the positive and negative electrodes and the like. Also, in case of the spiral structure, the non-aqueous electrolyte cell and the polymer cell can be made by preparing a sheet-shaped positive electrode, sandwiching between collectors, piling the sheet-shaped negative electrode thereon and then winding them or the like.

The following examples are given in illustration of the invention and are not intended as limitations thereof.

Non-Aqueous Electrolyte for Cell and Non-Aqueous Electrolyte Cell

Example 1

There is prepared a mixed solution comprising 50% by volume of ethylene carbonate (EC, boiling point 238° C.), 40% by volume of diethyl carbonate (DEC, boiling point 127° C.), 5% by volume of an additive A [a cyclic phosphazene compound of the formula (II) wherein n is 3, three of six $R^4$s are methoxy group ($CH_3O$—) and three thereof are fluorine, viscosity at 25° C.: 3.9 mPa·s, boiling point 230° C.] and 5% by volume of an additive B [a cyclic phosphazene compound of the formula (II) wherein n is 3, one of six $R^4$s is ethoxy group ($CH_3CH_2O$—) and five thereof are fluorine, viscosity at 25° C.: 1.2 mPa·s, boiling point 125° C.], and then $LiPF_6$ (support salt) is dissolved in the mixed solution at a concentration of 1 mol/L (M) to prepare a non-aqueous electrolyte. Furthermore, the safety of the non-aqueous electrolyte thus obtained is evaluated according to the following method. The result is shown in Table 1.

(1) Safety of the Non-Aqueous Electrolyte

The safety of the non-aqueous electrolyte is evaluated by measuring a combustion behavior of a flame ignited under an atmospheric environment according to a method arranging UL94HB method of UL (Underwriting Laboratory) standard. In this case, the ignitability, combustibility, carbide formation and phenomenon in secondary ignition are also observed. Concretely, a test piece of 127 mm×12.7 mm is prepared by penetrating 1.0 mL of the electrolyte into a non-combustible quartz fiber based on UL test standard. At this moment, "non-combustibility" means a property that a test flame does not ignite a test piece (combustion length: 0 mm), "flame retardance" means a property that the ignited flame does not arrive at a line of 25 mm and the ignition is not observed in the falling object, "self-extinguishing property" means a property that the ignited flame extinguishes at a line of 25-100 mm and the ignition is not observed in a falling object, and "combustion property" means a property that the ignited flame exceeds a line of 100 mm.

Then, 94 parts by mass of $LiMn_2O_4$ (an active material for a positive electrode) is added with 3 parts by mass of acetylene black (electrically conducting agent) and 3 parts by mass of polyvinylidene fluoride (binding agent) and kneaded with an organic solvent (mixed solvent of 50/50 vol % of ethyl acetate and ethanol), and thereafter the kneaded mass is applied onto an aluminum foil having a thickness of 25 μm (collector) with a doctor blade and dried in hot air (100-120° C.) to prepare a positive electrode sheet having a thickness of 80 μm.

A lithium foil having a thickness of 150 μm is piled on the positive electrode sheet through a separator having a thickness of 25 μm (micro-porous film: made of polypropylene) and wound to prepare a cylinder type electrode. A length of the positive electrode in the cylinder type electrode is about 260 mm. The above-described electrolyte is poured into the cylinder type electrode and sealed to prepare a size AA lithium cell (non-aqueous electrolyte secondary cell). With respect to the cell thus obtained, a nail penetration test and an overcharge test are carried out according to the following methods. The results are shown in Table 1.

(2) Nail Penetration Test

After the test cell is charged thoroughly, a nail having a diameter of 5 mm is penetrated through an approximately central part of the cell in a vertical direction to the surface of the electrode and left for 24 hours, during which it is observed whether or not the cell ignites.

(3) Overcharge Test

The cell is overcharged up to 250% of rated capacity at a current value of 1 C (a current which can charge thoroughly for one hour) and then it is observed whether or not the cell ignites. In this case, the test cell is not provided with a safety circuit.

Examples 2-9 and Comparative Examples 1-6

Mixed solutions according to formulations shown in Table 1 or 2 are prepared and $LiPF_6$ (support salt) is dissolved in the mixed solutions at a concentration of 1 mol/L (M) to prepare non-aqueous electrolytes. The safeties of the non-aqueous electrolytes thus obtained are evaluated in the same manner as in Example 1. Also, non-aqueous electrolyte secondary cells are made by using the non-aqueous electrolytes in the same manner as in Example 1 and the nail penetration tests and the overcharge tests are carried out to these cells. The results are shown in Tables 1 and 2.

In Tables 1 and 2, PC is propylene carbonate (boiling point 242° C.), DMC is dimethyl carbonate (boiling point 90° C.), EMC is ethyl methyl carbonate (boiling point 108° C.) and MF is methyl formate (boiling point 32° C.).

Furthermore, an additive C is a cyclic phosphazene compound of the formula (II) wherein n is 4, all of eight $R^4$s are fluorine (viscosity at 25° C.: 0.8 mPa·s, boiling point 86° C.); an additive D is a cyclic phosphazene compound of the formula (II) wherein n is 3, all of six $R^4$s are fluorine (viscosity at 25° C.: 0.8 mPa·s, boiling point 51° C.); an additive E is a cyclic phosphazene compound of the formula (II) wherein n is 3, one of six $R^4$s is methoxy group ($CH_3O$—) and five thereof are fluorine (viscosity at 25° C.: 1.8 mPa·s, boiling point 110° C.); an additive F is a cyclic phosphazene compound of the formula (II) wherein n is 3, three of six $R^4$s are ethoxy group (CH$_3$CH$_2$O—) and three thereof are fluorine (viscosity at 25° C.: 4.0 mPa·s, boiling point is more than 300° C.); and an additive G is a cyclic phosphazene compound of the formula (II) wherein n is 3, one of six R$^4$s is isopropoxy group [(CH$_3$)$_2$CHO—] and five thereof are fluorine (viscosity at 25° C.: 1.1 mPa·s, boiling point 137° C.).

EC, the cell of Comparative Example 4, which uses the electrolyte not comprising a phosphorus and/or nitrogen containing compound having a boiling point near to that of EC and a phosphorus and/or nitrogen containing compound having a boiling point near to that of DEC but comprising a phosphazene compound having a boiling point largely different

TABLE 1

|  | Aprotic organic solvent | | | Additive | | | | Nail | |
|---|---|---|---|---|---|---|---|---|---|
|  | Kind of solvent | Amount (vol %) | Boiling point (° C.) | Kind of additive | Amount (vol %) | Boiling point (° C.) | Safety of electrolyte | penetration test for cell | Overcharge test for cell |
| Example 1 | EC | 50 | 238 | Additive A | 5 | 230 | Non-combustibility | No ignition | No ignition |
|  | DEC | 40 | 127 | Additive B | 5 | 125 |  |  |  |
| Example 2 | EC | 20 | 238 | Additive A | 5 | 230 | Non-combustibility | No ignition | No ignition |
|  | DMC | 70 | 90 | Additive C | 5 | 86 |  |  |  |
| Example 3 | PC | 20 | 242 | Additive A | 5 | 230 | Non-combustibility | No ignition | No ignition |
|  | DMC | 70 | 90 | Additive C | 5 | 96 |  |  |  |
| Example 4 | EC | 30 | 238 | Additive A | 3 | 230 | Non-combustibility | No ignition | No ignition |
|  | DEC | 55 | 127 | Additive B | 7 | 125 |  |  |  |
|  | — |  |  | Additive B | 5 | >300 |  |  |  |
| Example 5 | EC | 30 | 238 | Additive A | 3 | 230 | Non-combustibility | No ignition | No ignition |
|  | DMC | 60 | 90 | Additive C | 5 | 86 |  |  |  |
|  | — |  |  | Additive F | 2 | >300 |  |  |  |
| Example 6 | PC | 40 | 242 | Additive A | 3 | 230 | Non-combustibility | No ignition | No ignition |
|  | DMC | 50 | 90 | Additive C | 5 | 86 |  |  |  |
|  | — |  |  | Additive F | 2 | >300 |  |  |  |
| Example 7 | EC | 20 | 238 | Additive A | 5 | 230 | Non-combustibility | No ignition | No ignition |
|  | EMC | 70 | 108 | Additive C | 5 | 86 |  |  |  |
| Example 8 | EC | 15 | 238 | Additive A | 5 | 230 | Non-combustibility | No ignition | No ignition |
|  | EMC | 75 | 108 | Additive B | 5 | 125 |  |  |  |
| Example 9 | EC | 40 | 238 | Additive A | 5 | 230 | Non-combustibility | No ignition | No ignition |
|  | MF | 50 | 32 | Additive D | 5 | 51 |  |  |  |

TABLE 2

|  | Aprotic organic solvent | | | Additive | | | | Nail | |
|---|---|---|---|---|---|---|---|---|---|
|  | Kind of solvent | Amount (vol %) | Boiling point (° C.) | Kind of additive | Amount (vol %) | Boiling point (° C.) | Safety of electrolyte | penetration test for cell | Overcharge test for cell |
| Comparative Example 1 | EC | 50 | 238 | — |  |  | Combustion property | Ignition | Ignition |
|  | DEC | 50 | 127 | — |  |  |  |  |  |
| Comparative Example 2 | EC | 25 | 238 | — |  |  | Combustion property | Ignition | Ignition |
|  | DMC | 75 | 90 | — |  |  |  |  |  |
| Comparative Example 3 | EC | 30 | 238 | — |  |  | Flame retardance | Ignition | Ignition |
|  | DEC | 65 | 127 | Additive E | 5 | 110 |  |  |  |
| Comparative Example 4 | EC | 30 | 238 | — |  |  | Self-estinguishing property | Ignition | Ignition |
|  | DEC | 65 | 127 | — |  |  |  |  |  |
|  | — |  |  | Additive F | 5 | >300 |  |  |  |
| Comparative Example 5 | EC | 50 | 238 | — |  |  | Non-combustibility | No ignition | No ignition |
|  | DEC | 40 | 127 | Additive G | 10 | 137 |  |  |  |
| Comparative Example 6 | EC | 50 | 238 | Additive A | 5 | 230 | Flame retardance | Ignition | Ignition |
|  | MF | 40 | 32 | — |  |  |  |  |  |
|  | — |  |  | Additive G | 5 | 137 |  |  |  |

The non-aqueous electrolytes of the examples, in which to each of the aprotic organic solvents is added a phosphazene compound having a boiling point near to that of the respective aprotic organic solvent, are high in the safety, and also the non-aqueous electrolyte secondary cells using the electrolytes do not ignite in both of the nail penetration test and the overcharge test and are confirmed to have a high safety even in the emergency.

On the contrary, the cells of Comparative Examples 1 and 2, which use the electrolyte not comprising a phosphorus and/or nitrogen containing compound, ignite in the nail penetration test and the overcharge test. Moreover, the cell of Comparative Example 3, which uses the electrolyte comprising a phosphazene compound having a boiling point near to that of DEC but not comprising a phosphorus and/or nitrogen containing compound having a boiling point near to that of from those of DEC and EC, and the cell of Comparative Example 6, which uses the electrolyte not comprising a phosphorus and/or nitrogen containing compound having a boiling point near to that of MF but comprising a phosphazene compound having a boiling point near to that of EC and further a phosphazene compound having a boiling point largely different from those of EC and MF, ignite in the nail penetration test and the overcharge test. Furthermore, the cell of Comparative Example 5, which uses the electrolyte comprising a phosphazene compound having a boiling point near to that of DEC but not comprising a phosphorus and/or nitrogen containing compound having a boiling point near to that of EC, does not ignite in the nail penetration test but ignites in the overcharge test.

As seen from the above results, the safety of the non-aqueous electrolyte can be improved by adding the phosphorus and/or nitrogen containing compound having a boiling point near to that of the respective aprotic organic solvent constituting the non-aqueous electrolyte, and also the safety in the emergency of the non-aqueous electrolyte secondary cell can be improved significantly by using the non-aqueous electrolyte in the secondary cell.

Example 10

There is prepared a mixed solution comprising 60% by volume of propylene carbonate (PC, boiling point 242° C.), 30% by volume of 1,2-dimethoxy ethane (DME, boiling point 84° C.), 5% by volume of an additive A [a cyclic phosphazene compound of the formula (II) wherein n is 3, three of six $R^4$s are methoxy group ($CH_3O$—) and three thereof are fluorine, viscosity at 25° C.: 3.9 mPa·s, boiling point 230° C.] and 5% by volume of an additive C [a cyclic phosphazene compound of the formula (II) wherein n is 4, all of eight $R^4$s are fluorine, viscosity at 25° C.: 0.8 mPa·s, boiling point 86° C.], and then $LiBF_4$ (support salt) is dissolved in the mixed solution at a concentration of 0.75 mol/L (M) to prepare a non-aqueous electrolyte. The safety of the non-aqueous electrolyte thus obtained is evaluated in the same manner as in Example 1. The result is shown in Table 3.

Then, a positive electrode pellet having a thickness of 500 μm is prepared by mixing and kneading $MnO_2$ (active material for a positive electrode), acetylene black (electrically conducting agent) and polyvinylidene fluoride (binding agent) at a ratio of 8:1:1 (mass ratio), pressing and pelletizing the kneaded mass onto a nickel foil having a thickness of 25 μm (collector) and drying by heating (100-120° C.).

The positive electrode pellet is punched out at 16 mmϕ to form a positive electrode, and a lithium foil (thickness 0.5 mm) is punched out at 16 mmϕ to form a negative electrode. The positive and negative electrodes are set opposite to each other through a cellulose separator [TF4030, made by Nippon Kodo Kami-kogyo Co., Ltd.], and the above-mentioned electrolyte is poured and sealed to make a non-aqueous electrolyte primary cell (lithium primary cell) of CR 2016 model. With respect to the cell thus obtained, a heating test is carried out by the following method. The result is shown in Table 3.

(4) Heating Test

The cell is placed in an oven, heated up to 160° C. at a rate of 5±2° C./min, and held at 160° C. for 60 minutes, during which it is observed whether or not the cell ignites.

Examples 11-15 and Comparative Examples 7-12

Mixed solutions according to formulations shown in Table 3 are prepared and $LiBF_4$ (support salt) is dissolved in each of the mixed solutions at a concentration of 0.75 mol/L (M) to prepare a non-aqueous electrolyte. The safeties of the non-aqueous electrolytes thus obtained are evaluated in the same manner as in Example 1. Moreover, non-aqueous electrolyte primary cells are made by using the non-aqueous electrolytes in the same manner as in Example 10 and the heating test is carried out to the cells. The results are shown in Table 3.

In Table 3, GBL is γ-butyrolactone (boiling point 204° C.). Furthermore, an additive B is a cyclic phosphazene compound of the formula (II) wherein n is 3, one of six $R^4$s is ethoxy group ($CH_3CH_2O$—) and five thereof are fluorine (viscosity at 25° C.: 1.2 mPa·s, boiling point 125° C.); an additive F is a cyclic phosphazene compound of the formula (II) wherein n is 3, three of six $R^4$s are ethoxy group ($CH_3CH_2O$—) and three thereof are fluorine (viscosity at 25° C.: 4.0 mPa·s, boiling point is more than 300° C.); an additive H is a cyclic phosphazene compound of the formula (II) wherein n is 3, two of six $R^4$s are ethoxy group ($CH_3CH_2O$—) and four thereof are fluorine (viscosity at 25° C.: 1.2 mPa·s, boiling point 195° C.); and an additive I is a cyclic phosphazene compound of the formula (II) wherein n is 3, one of six $R^4$s is phenoxy group (PhO—) and five thereof are fluorine (viscosity at 25° C.: 1.7 mPa·s, boiling point 195° C.).

TABLE 3

| | Aprotic organic solvent | | | Additive | | | | |
| --- | --- | --- | --- | --- | --- | --- | --- | --- |
| | Kind of solvent | Amount (vol %) | Boiling point (° C.) | Kind of additive | Amount (vol %) | Boiling point (° C.) | Safety of electrolyte | Heating test |
| Example 10 | PC | 60 | 242 | Additive A | 5 | 230 | Non-combustibility | No ignition |
| | DME | 30 | 84 | Additive C | 5 | 86 | | |
| Example 11 | GBL | 90 | 204 | Additive H | 10 | 195 | Non-combustibility | No ignition |
| Example 12 | GBL | 90 | 204 | Additive I | 10 | 195 | Non-combustibility | No ignition |
| Example 13 | PC | 50 | 242 | Additive A | 3 | 230 | Non-combustibility | No ignition |
| | DME | 40 | 84 | Additive C | 5 | 86 | | |
| | | — | | Additive F | 2 | >300 | | |
| Example 14 | GBL | 90 | 204 | Additive H | 8 | 195 | Non-combustibility | No ignition |
| | | — | | Additive F | 2 | >300 | | |
| Example 15 | GBL | 90 | 204 | Additive I | 8 | 195 | Non-combustibility | No ignition |
| | | — | | Additive F | 2 | >300 | | |
| Comparative Exmaple 7 | PC | 50 | 242 | | — | | Combustion property | Ignition |
| | DME | 50 | 84 | | — | | | |
| Comparative Example 8 | GBL | 100 | 204 | | — | | Combustion property | Ignition |
| Comparative Example 9 | PC | 50 | 242 | Additive A | 5 | 230 | Combustion Property | Ignition |
| | DME | 45 | 84 | | — | | | |
| Comparative Example 10 | PC | 50 | 242 | | — | | Flame retardance | Ignition |
| | DME | 35 | 84 | | — | | | |
| | | — | | Additive B | 15 | 125 | | |
| Comparative Example 11 | GBL | 85 | 204 | Additive B | 15 | 125 | Non-combustibility | Ignition |
| Comparative Example 11 | GBL | 95 | 204 | Additive C | 15 | 125 | Non-combustibility | Ignition |

The non-aqueous electrolytes of the examples, in which to each of the aprotic organic solvents is added a phosphazene compound having a boiling point near to that of the respective aprotic organic solvent, are high in the safety, and the non-aqueous electrolyte primary cells using the electrolytes do not ignite in the heating test and are confirmed to have high safety even in the emergency.

On the contrary, the cells of Comparative Examples 7 and 8, which use the electrolyte comprising no phosphorus and/or nitrogen containing compound, ignite in the heating test. Moreover, the cell of Comparative Example 9, which uses the electrolyte comprising a phosphazene compound having a boiling point near to that of PC but not comprising a phosphorus and/or nitrogen containing compound having a boiling point near to that of DME, the cell of Comparative Example 10, which uses the electrolyte not comprising a phosphorus and/or nitrogen containing compound having a boiling point near to that of PC and a phosphorus and/or nitrogen containing compound having a boiling point near to that of DME but comprising a phosphazene compound having a boiling point largely different from those of PC and DME, and the cells of Comparative Examples 11 and 12, which use the electrolyte not comprising a phosphorus and/or nitrogen containing compound having a boiling point near to that of GBL but comprising a phosphazene compound having a boiling point largely different from that of GBL, ignite in the heating test.

As seen from the above results, the safety of the non-aqueous electrolyte can be improved by adding the phosphorus and/or nitrogen containing compound having a boiling point near to that of the respective aprotic organic solvent constituting the non-aqueous electrolyte, and also the safety in the emergency of the non-aqueous electrolyte primary cell can be improved significantly by using the non-aqueous electrolyte in the primary cell.

Electrolyte for Polymer Cell and Polymer Cell

Example 16

There is prepared a mixed solution comprising 50% by volume of ethylene carbonate (EC, boiling point 238° C.), 40% by volume of diethyl carbonate (DEC, boiling point 127° C.), 5% by volume of an additive A [a cyclic phosphazene compound of the formula (II) wherein n is 3, three of six $R^4$s are methoxy group ($CH_3O$—) and three thereof are fluorine, viscosity at 25° C.: 3.9 mPa·s, boiling point 230° C.] and 5% by volume of an additive B [a cyclic phosphazene compound of the formula (II) wherein n is 3, one of six $R^4$s is ethoxy group ($CH_3CH_2O$—) and five thereof are fluorine, viscosity at 25° C.: 1.2 mPa·s, boiling point 125° C.].

Then, 3.6 g of polyethylene oxide [made by Ardrich, Mw=5,000,000-6,000,000] and 0.4 g of $LiPF_6$ (support salt) are mixed and added with 10 mL of acetonitrile (volatile solvent), which are uniformly mixed and dissolved at 80° C. to obtain polyethylene oxide sol (containing polyethylene oxide and $LiPF_6$). This sol is heated to 40° C. under vacuum to vaporize acetonitrile and dried. Thereafter, it is swollen by impregnating with 1 mL of the above-described mixed solution to obtain a gel-like electrolyte for a polymer cell. Furthermore, the safety of the electrolyte for the polymer cell thus obtained is evaluated according to the following method. The result is shown in Table 4.

(5) Safety of the Electrolyte for the Polymer Cell

The safety of the electrolyte for the polymer cell is evaluated by measuring a combustion behavior of a flame ignited under an atmospheric environment according to a method arranging UL94HB method of UL (Underwriting Laboratory) standard. In this case, the ignitability, combustibility, carbide formation and phenomenon in secondary ignition are also observed. Concretely, a test piece of 127 mm×12.7 mm made of the electrolyte for the polymer cell is prepared based on UL test standard. At this moment, "non-combustibility" means a property that a test flame does not ignite a test piece (combustion length: 0 mm), "flame retardance" means a property that the ignited flame does not arrive at a line of 25 mm and the ignition is not observed in the falling object, "self-extinguishing property" means a property that the ignited flame extinguishes at a line of 25-100 mm and the ignition is not observed in a falling object, and "combustion property" means a property that the ignited flame exceeds a line of 100 mm.

Then, 94 parts by mass of $LiMn_2O_4$ (an active material for a positive electrode) is added with 3 parts by mass of acetylene black (electrically conducting agent) and 3 parts by mass of polyvinylidene fluoride (binding agent) and kneaded with an organic solvent (mixed solvent of 50/50 vol % of ethyl acetate and ethanol), and then the kneaded mass is applied onto an aluminum foil having a thickness of 25 μm (collector) with a doctor blade and dried in hot air (100-120° C.) to prepare a positive electrode sheet having a thickness of 80 μm. Also, a graphite sheet having a thickness of 150 μm is used for a negative electrode.

Also, polyethylene oxide sol is prepared in the same manner as in the preparation of the above electrolyte for the polymer cell, and this sol is applied onto both surfaces of a polyethylene separator with a doctor blade so as to have a thickness of 150 μm and then acetonitrile is vaporized to prepare polyethylene oxide-lithium gel electrolyte (dry gel). This gel is sandwiched between the positive electrode sheet and the negative electrode (graphite sheet) and wound up and further swollen by impregnating with the above-described mixed solution to prepare a size AA polymer cell. A length of the positive electrode in the cell is about 260 mm. With respect to the polymer cell thus obtained, the nail penetration test and the overcharge test are carried out according to the above-described methods. The results are shown in Table 4.

Examples 17-24 and Comparative Examples 13-18

Mixed solutions according to formulations shown in Table 4 or 5 are prepared, and electrolytes for polymer cells are prepared by using the mixed solutions in the same manner as in Example 16. The safeties of the electrolytes for the polymer cells thus obtained are evaluated in the same manner as in Example 16. Also, polymer cells are made by using the mixed solutions in the same manner as in Example 16 and the nail penetration tests and the overcharge tests are carried out to the cells. The results are shown in Tables 4 and 5.

In Tables 4 and 5, PC is propylene carbonate (boiling point 242° C.), DMC is dimethyl carbonate (boiling point 90° C.), EMC is ethyl methyl carbonate (boiling point 108° C.) and MF is methyl formate (boiling point 32° C.).

Furthermore, an additive C is a cyclic phosphazene compound of the formula (II) wherein n is 4, all of eight $R^4$s are fluorine (viscosity at 25° C.: 0.8 mPa·s, boiling point 86° C.); an additive D is a cyclic phosphazene compound of the formula (II) wherein n is 3, all of six $R^4$s are fluorine (viscosity at 25° C.: 0.8 mPa·s, boiling point 51° C.); an additive E is a cyclic phosphazene compound of the formula (II) wherein n is 3, one of six $R^4$s is methoxy group ($CH_3O$—) and five thereof are fluorine (viscosity at 25° C.: 1.8 mPa·s, boiling point 110° C.); an additive F is a cyclic phosphazene compound of the formula (II) wherein n is 3, three of six $R^4$s are ethoxy group (CH$_3$CH$_2$O—) and three thereof are fluorine (viscosity at 25° C.: 4.0 mPa·s, boiling point is more than 300° C.); and an additive G is a cyclic phosphazene compound of the formula (II) wherein n is 3, one of six R$^4$s is isopropoxy group [(CH$_3$)$_2$CHO—] and five thereof are fluorine (viscosity at 25° C.: 1.1 mPa·s, boiling point 137° C.).

boiling point near to that of EC, the polymer cell of Comparative Example 16, which uses the mixed solution not comprising a phosphorus and/or nitrogen containing compound having a boiling point near to that of EC and a phosphorus and/or nitrogen containing compound having a boiling point near to that of DEC but comprising a phosphazene compound having

TABLE 4

| | Aprotic organic solvent | | | Additive | | | | Nail | |
|---|---|---|---|---|---|---|---|---|---|
| | Kind solvent | Amount (vol %) | Boiling point (° C.) | Kind of additive | Amount (vol %) | Boiling point (° C.) | Safety of electrolyte | penetration test for cell | Overcharge test for cell |
| Example 16 | EC | 50 | 238 | Additive A | 5 | 230 | Non-combustibility | No ignition | No ignition |
| | DEC | 40 | 127 | Additive B | 5 | 125 | | | |
| Example 17 | EC | 20 | 238 | Additive A | 5 | 230 | Non-combustibility | No ignition | No ignition |
| | DMC | 70 | 90 | Additive C | 5 | 86 | | | |
| Example 18 | PC | 20 | 242 | Additive A | 5 | 230 | Non-combustibility | No ignition | No ignition |
| | DMC | 70 | 90 | Additive C | 5 | 86 | | | |
| Example 19 | EC | 30 | 238 | Additive A | 3 | 230 | Non-combustibility | No ignition | No ignition |
| | DEC | 55 | 127 | Additive B | 7 | 125 | | | |
| | — | | | Additive F | 5 | >300 | | | |
| Example 20 | EC | 30 | 238 | Additive A | 3 | 230 | Non-combustibility | No ignition | No ignition |
| | DMC | 60 | 90 | Additive C | 5 | 86 | | | |
| | — | | | Additive F | 5 | >300 | | | |
| Example 21 | PC | 40 | 242 | Additive A | 3 | 230 | Non-combustibility | No ignition | No ignition |
| | DMC | 50 | 90 | Additive C | 5 | 86 | | | |
| | — | | | Additive F | 5 | >300 | | | |
| Example 22 | EC | 20 | 238 | Additive A | 5 | 230 | Non-combustibility | No ignition | No ignition |
| | EMC | 70 | 108 | Additive C | 5 | 86 | | | |
| Example 23 | EC | 15 | 238 | Additive A | 5 | 230 | Non-combustibility | No ignition | No ignition |
| | EMC | 75 | 108 | Additive B | 5 | 125 | | | |
| Example 24 | EC | 40 | 238 | Additive A | 5 | 230 | Non-combustibility | No ignition | No ignition |
| | MF | 50 | 32 | Additive D | 5 | 51 | | | |

TABLE 5

| | Aprotic organic solvent | | | Additive | | | | Nail | |
|---|---|---|---|---|---|---|---|---|---|
| | Kind solvent | Amount (vol %) | Boiling point (° C.) | Kind of additive | Amount (vol %) | Boiling point (° C.) | Safety of electrolyte | penetration test for cell | Overcharge test for cell |
| Comparative Example 13 | EC | 50 | 238 | — | | | Combustion property | Ignition | Ignition |
| | DEC | 50 | 127 | — | | | | | |
| Comparative Example 14 | EC | 25 | 238 | — | | | Combustion property | Ignition | Ignition |
| | DMC | 75 | 90 | — | | | | | |
| Comparative Example 15 | EC | 30 | 238 | — | | | Flame retardance | Ignition | Ignition |
| | DEC | 65 | 127 | Additive E | 5 | 110 | | | |
| Comparative Example 16 | EC | 30 | 238 | — | | | Self-extinguishing property | Ignition | Ignition |
| | DEC | 65 | 127 | — | | | | | |
| | — | | | Additive F | 5 | >300 | | | |
| Comparative Example 17 | EC | 50 | 238 | — | | | Non-combustibility | No ignition | No ignition |
| | DEC | 40 | 127 | Additive G | 10 | 137 | | | |
| Comparative Example 18 | EC | 50 | 238 | Additive A | 5 | 230 | Flame retardance | Ignition | Ignition |
| | MF | 40 | 32 | — | | | | | |
| | — | | | Additive G | 5 | 137 | | | |

The electrolytes for the polymer cells of the examples using the mixed solutions, in which to each of the aprotic organic solvents is added a phosphazene compound having a boiling point near to that of the respective aprotic organic solvent, are high in the safety, and the polymer cells using the electrolytes do not ignite in both of the nail penetration test and the overcharge test and are confirmed to have high safety even in the emergency.

On the contrary, the polymer cells of Comparative Examples 13 and 14, which use the mixed solution not comprising a phosphorus and/or nitrogen containing compound, ignite in the nail penetration test and the overcharge test. Also, the polymer cell of Comparative Example 15, which uses the mixed solution comprising a phosphazene compound having a boiling point near to that of DEC but not comprising a phosphorus and/or nitrogen containing compound having a boiling point largely different from those of DEC and EC, and the polymer cell of Comparative Example 18, which uses the mixed solution not comprising a phosphorus and/or nitrogen containing compound having a boiling point near to that of MF but comprising a phosphazene compound having a boiling point near to that of EC and a phosphazene compound having a boiling point largely different from those of EC and MF, ignite in the nail penetration test and the overcharge test. Furthermore, the polymer cell of Comparative Example 17, which uses the mixed solution comprising a phosphazene compound having a boiling point near to that of DEC but not comprising a phosphorus and/or nitrogen containing compound having a boiling point near to that of EC, does not ignite in the nail penetration test but ignites in the overcharge test.

As seen from the above results, the safety of the electrolyte for the polymer cell can be improved by using the mixed solution comprising at least one aprotic organic solvent and the compound containing phosphorus and/or nitrogen in its molecule and having a boiling point near to that of the respective aprotic organic solvent for the electrolyte, and also the safety in the emergency of the polymer cell can be improved significantly by using the electrolyte in the polymer cell.

The invention claimed is:

1. A non-aqueous electrolyte for a cell comprising two or more aprotic organic solvents selected from the group consisting of ethylene carbonate, propylene carbonate, diethyl carbonate, dimethyl carbonate, ethyl methyl carbonate and methyl formate, and a support salt, which further includes two or more phosphazene compounds, wherein to each of the aprotic organic solvents is added the phosphazene compound having a difference of a boiling point from that of the respective aprotic organic solvent of not more than 25° C., and the number of kinds of the phosphazene compounds is equal to that of the aprotic organic solvents.

2. A non-aqueous electrolyte cell comprising a non-aqueous electrolyte as claimed in claim 1, a positive electrode and a negative electrode.

3. An electrolyte for a polymer cell comprising two or more organic solvents, a polymer and a support salt, which further includes two or more phosphazene compounds, wherein to each of the aprotic organic solvents is added the phosphazene compound having a difference of a boiling point from that of the respective aprotic organic solvent of not more than 25° C., and the number of kinds of the phosphazene compounds is equal to that of the aprotic organic solvents.

4. An electrolyte for a polymer cell according to claim 3, wherein the aprotic organic solvent is at least one selected from the group consisting of ethylene carbonate, propylene carbonate, diethyl carbonate, dimethyl carbonate, ethyl methyl carbonate and methyl formate.

5. A polymer cell comprising an electrolyte as claimed in any one of claim 3 or 4, a positive electrode and a negative electrode.

* * * * *